March 13, 1956  A. KREIDLER  2,738,064
PROCESS FOR THE PRODUCTION OF SLEEVE-SHAPED, SPECIALLY
THIN-WALLED, HOLLOW BODIES WITH ONE OR MORE
STRAND-LIKE EXTENSIONS
Filed Dec. 17, 1952
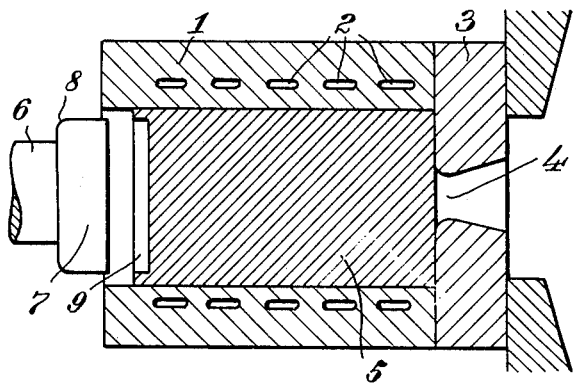
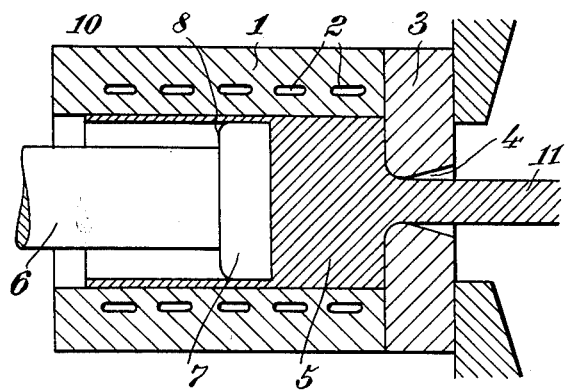
Inventor:
Alfred Kreidler

United States Patent Office 2,738,064
Patented Mar. 13, 1956

2,738,064

PROCESS FOR THE PRODUCTION OF SLEEVE-SHAPED, SPECIALLY THIN-WALLED, HOLLOW BODIES WITH ONE OR MORE STRAND-LIKE EXTENSIONS

Alfred Kreidler, Stuttgart, Germany

Application December 17, 1952, Serial No. 326,426

Claims priority, application Germany December 29, 1951

1 Claim. (Cl. 207—10)

The invention concerns the production of sleeve-shaped, particularly, thin-walled, hollow bodies with one or more strand-like extensions. In order to produce such hollow bodies of material capable of being subjected to a shearing action, preferably of light metal, quickly and cheaply by mass production, according to the invention a blank is inserted into the holder of an extrusion press from which the extension or extensions are extruded by an extrusion die of smaller diameter than that of the holder, after which the "shell" sheared off between extrusion die and holder forms the wall of the hollow body.

It is indeed already known to produce mushroom shaped bodies i. e. rivets, screws or the like, for example in the extrusion process in such a way that the shaft of the body to be produced was pressed as a strand out of the aperture of the matrix, whilst at the same time the residue of the material remaining in the holder received the desired head shape. Also it is already known to extrude a tube with a sleeve projection of a bowl-like preliminary shape in such a way that the tube leaves the matrix as an extended tube, whilst a corresponding part of the bowl is made to flow against the direction of pressing for the formation of the sleeve projection.

It is, therefore, one object of the present invention to produce sleeve-shaped hollow bodies with strand-like extensions the so-called "shell" extrusion pressing in which it is especially important for the "shell" of the pressed articles to remain, i. e. is not subjected to any kind of stress operation.

It is another object of the present invention to produce sleeve-shaped hollow bodies with strand-like extensions, in which the sufficiently thin wall of said hollow bodies cools off automatically to such an extent that it resists the stress or moulding operations; and in which the somewhat thicker wall of said hollow bodies can be assisted by cooling the marginal area of the blank, preferably by circulating a fluid in the wall of the holder.

It is yet another object of the present invention to produce sleeve-shaped hollow bodies with strand-like extensions in which in order to keep the extrusion die central to the blank so that an equal thickness of wall is obtained around the sleeve, it is advantageous to provide the blank with a central recess or shallow bore in which the die head can enter at the beginning of the present operation.

It is also another object of the present invention to produce sleeve-shaped hollow bodies with strand-like extensions in which in order to meet the difficulty, that the extrusion die can only be withdrawn from the finished hollow body, it is advisable to provide the extrusion die with a head, the diameter of which is greater than the diameter of the neck of the die; and it is also expedient to relieve or round off the trailing or rear edge of the head; so that the sleeve of the pressed article then no longer abuts on the whole length of the die but only on the comparatively short part of the head, whilst behind it some play between sleeve and neck of the die is allowed; and the die can thus be withdrawn without difficulty from the hollow body, smoothing, if required, with the rounded off rear edge of its head, the inner surface of the sleeve.

With these and other objects in view which will become apparent in the following detailed description, the present invention will be clearly understood in connection with the accompanying drawings, in which:

Figure 1 is a diagrammatic longitudinal section showing the conditions before the beginning of the pressing operation; and Fig. 2 is a similar view during the course of the pressing operation.

A hollow cylindrical holder 1 has in its wall cooling channels 2, through which a cooling fluid is passed.

The holder is sealed by a matrix 3 provided with an extrusion aperture 4. A head 7 carried by a die neck 6 is used for the extrusion of a blank 5 inserted in the holder. The diameter of the head 7 exceeds that of the neck 6, but is smaller than the inner diameter of the holder 1. The rear edge 8 of the head 7 is rounded off. The blank 5 has on its rear frontal surface a central shallow bore 9 in which the die head 7 approximately fits.

In the pressing operation the head 7 enters first the shallow bore 9 and thus centers the die 6, 7 and the blank 5 relative to each other. In the further course of the pressing operation the "shell" 10 of the blank 2, remains, without suffering a change of shape as its temperature has fallen below the moulding temperature owing to the cooled wall of the holder, the reduction of the temperature of the "shell" 10 being brought about by any suitable cooling medium which may be the surrounding air in the forming of comparatively thin shells or a cooling fluid fed into the holder 1 if slightly thicker shells are formed. The core of the blank, on the other hand, is forced through the aperture 4 as an extruded length 11. Upon the completion of the pressing operation, the die 6, 7 may easily be withdrawn from the hollow space of the sleeve 10 in spite of the shrinking which has in the meantime occurred, also smoothing its inner surface by its rounded off rear edge 8.

While I have disclosed one embodiment of the present invention, it is to be understood that this embodiment is given by example only and not in a limiting sense, the scope of the present invention being determined by the objects and the claim.

I claim:

A process for the production of sleeve-like, particularly thin-walled, hollow bodies with one or more strand-like extensions of pressable material from a blank by means of a shearing die comprising the steps of confining said blank at its sides and at its front face except an area smaller than said front face to permit extrusion of said blank through said non-confined area in forward direction, axially shearing away the central portion of said blank from its peripheral portion to form a hollow body from the peripheral portion of said blank, and maintaining said sheared-off peripheral portion below its moulding temperature, in order to prevent extrusion of said blank in backward direction.

References Cited in the file of this patent

UNITED STATES PATENTS

| 54,121 | Crooke | Apr. 24, 1866 |
| 1,715,936 | Madden | June 4, 1929 |
| 1,935,286 | Born | Nov. 14, 1933 |
| 2,180,628 | Friden | Nov. 21, 1939 |
| 2,451,773 | Poux | Oct. 19, 1948 |

FOREIGN PATENTS

| 198,775 | Switzerland | Sept. 16, 1938 |
| 271,378 | Germany | Mar. 11, 1914 |
| 516,653 | France | Apr. 23, 1921 |
| 625,919 | Great Britain | July 6, 1949 |